(12) United States Patent
Candelori et al.

(10) Patent No.: US 10,480,326 B2
(45) Date of Patent: Nov. 19, 2019

(54) VANE FOR VARIABLE AREA TURBINE

(71) Applicant: UNITED TECHNOLOGIES CORPORATION, Farmington, CT (US)

(72) Inventors: David J. Candelori, Glastonbury, CT (US); Michael F. Blair, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 164 days.

(21) Appl. No.: 15/701,008

(22) Filed: Sep. 11, 2017

(65) Prior Publication Data

US 2019/0078440 A1 Mar. 14, 2019

(51) Int. Cl.
*F04D 29/54* (2006.01)
*F01D 5/14* (2006.01)
*F01D 17/14* (2006.01)
*F01D 9/04* (2006.01)
*F01D 17/16* (2006.01)
*F01D 5/18* (2006.01)

(52) U.S. Cl.
CPC ............. *F01D 5/148* (2013.01); *F01D 5/142* (2013.01); *F01D 5/145* (2013.01); *F01D 5/186* (2013.01); *F01D 9/041* (2013.01); *F01D 17/148* (2013.01); *F01D 17/16* (2013.01); *F01D 17/162* (2013.01); *F04D 29/544* (2013.01); *F05D 2240/122* (2013.01); *F05D 2240/304* (2013.01); *F05D 2260/202* (2013.01)

(58) Field of Classification Search
CPC ........ F04D 29/544; F01D 5/142; F01D 5/145; F01D 5/148; F01D 5/18; F01D 5/186; F01D 17/148; F05D 2240/122; F05D 2240/304; F05D 2260/202
USPC .......................................................... 415/156
See application file for complete search history.

(56) References Cited

U.S. PATENT DOCUMENTS 3,563,669 A 2/1971 Hockert et al.
4,705,452 A * 11/1987 Karadimas ............ F01D 17/162
                                                   415/115

(Continued)

FOREIGN PATENT DOCUMENTS

EP 2905425 A1 8/2015

OTHER PUBLICATIONS

European Search Report for Application No. 18193858.0-1006; dated Oct. 31, 2018; 7pgs.

*Primary Examiner* — Erick R Solis
(74) *Attorney, Agent, or Firm* — Cantor Colburn LLP

(57) ABSTRACT

Disclosed is a vane stage for a variable area turbine, comprising vane platforms comprising a first vane platform and a second vane platform, one of the vane platforms being a radial inner vane platform and another of the vane platforms being a radial outer vane platform, and a space therebetween defining an air flowpath; a primary vane body secured at opposing radial ends to the first vane platform and the second vane platform, a secondary vane body movably secured at the first vane platform, the secondary vane body being movable between a stowed position, wherein the secondary vane body is outside of the air flow path, and a deployed position, wherein the secondary vane body is extended between the plurality of vane platforms to form a vane trailing edge extension.

16 Claims, 6 Drawing Sheets

(56) References Cited

U.S. PATENT DOCUMENTS

| | | | | |
|---|---|---|---|---|
| 4,897,020 A * | 1/1990 | Tonks | ............... | F01D 5/186 |
| | | | | 415/115 |
| 5,314,301 A * | 5/1994 | Knight | ............... | F01D 5/148 |
| | | | | 415/160 |
| 5,520,511 A * | 5/1996 | Loudet | ............... | F01D 5/148 |
| | | | | 415/148 |
| 5,683,225 A | 11/1997 | Orlando et al. | | |
| 5,931,636 A * | 8/1999 | Savage | ............... | F01D 17/141 |
| | | | | 415/115 |
| 6,139,268 A * | 10/2000 | Murawski | ............... | B64C 3/54 |
| | | | | 416/23 |
| 6,419,464 B1 * | 7/2002 | Arnold | ............... | F01D 5/141 |
| | | | | 415/159 |
| 6,966,755 B2 * | 11/2005 | Garner | ............... | F01D 5/20 |
| | | | | 415/140 |
| 7,828,523 B2 * | 11/2010 | Bonnet | ............... | F03D 1/0633 |
| | | | | 416/1 |
| 8,052,388 B2 * | 11/2011 | McCaffrey | ............... | F01D 5/145 |
| | | | | 415/115 |
| 2002/0134070 A1 * | 9/2002 | Orlando | ............... | F01D 9/041 |
| | | | | 60/204 |
| 2012/0222397 A1 | 9/2012 | Smith et al. | | |
| 2013/0251539 A1 * | 9/2013 | Gautschi | ............... | F01D 5/187 |
| | | | | 416/97 R |
| 2013/0323080 A1 * | 12/2013 | Martin | ............... | F01D 5/186 |
| | | | | 416/97 R |
| 2016/0010486 A1 | 1/2016 | Christians | | |
| 2017/0254215 A1 * | 9/2017 | Bentley | ............... | F01D 17/085 |

\* cited by examiner

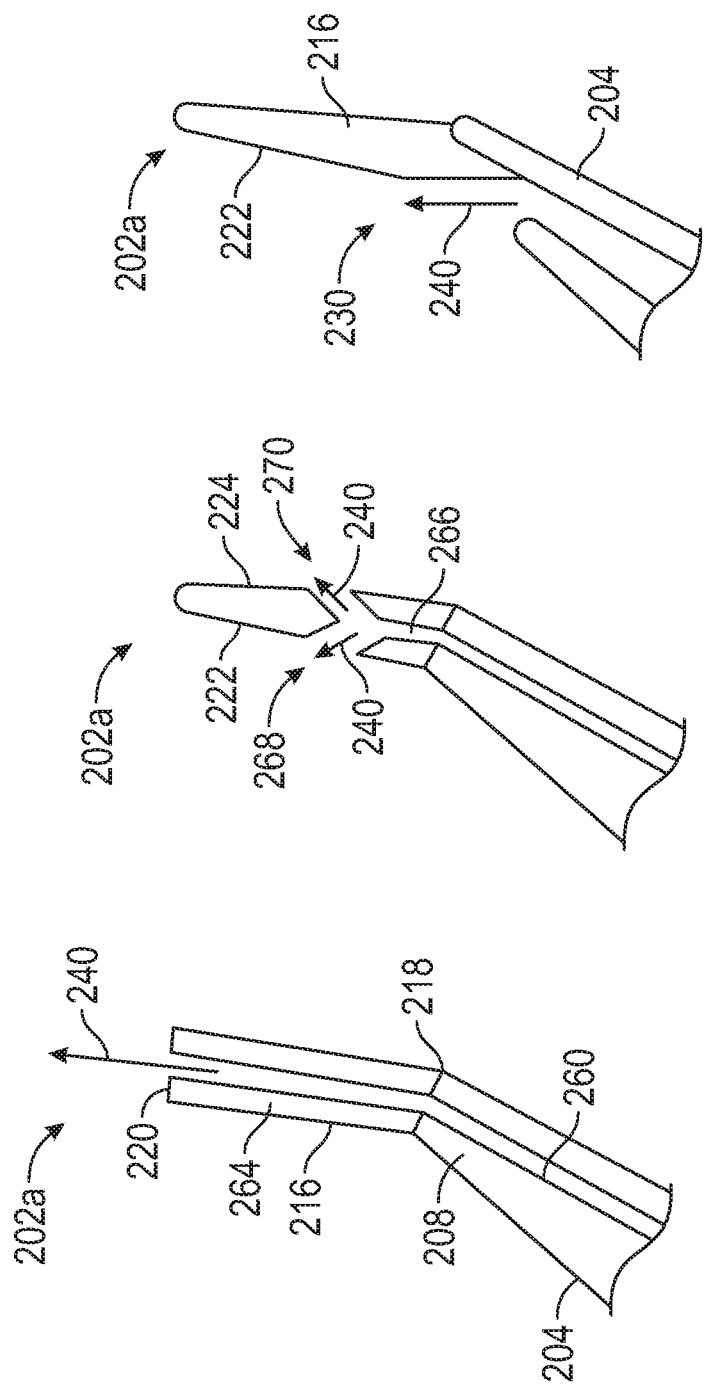

VANE FOR VARIABLE AREA TURBINE

BACKGROUND

Exemplary embodiments pertain to gas turbine engines and more specifically to variable area turbines.

Variable-Area-Turbine (VAT) designs may be configured to adjust the geometry of the flow-wise first vane or of multiple vane rows during various flight phases. One solution may be to rotate the first stage vanes. With this approach a complex platform configuration may be difficult to effectively cool. Accordingly a configuration for a VAT that may be easier to mechanically utilize and maintain is desired.

BRIEF DESCRIPTION

Disclosed is a vane stage for a variable area turbine, comprising: a plurality of vane platforms comprising a first vane platform and a second vane platform, one of the plurality of vane platforms being a radial inner vane platform and another of the plurality of vane platforms being a radial outer vane platform, and a space therebetween defining an air flowpath; a primary vane body secured at opposing radial ends to the first vane platform and the second vane platform, the primary vane body having a primary leading edge, a primary trailing edge, a primary pressure side and a primary suction side, a secondary vane body movably secured at the first vane platform, the secondary vane body having secondary leading edge, a secondary trailing edge, a secondary pressure side and a secondary suction side, and the secondary vane body being movable between a stowed position, wherein the secondary vane body is outside of the air flow path, and a deployed position, wherein the secondary vane body is extended between the plurality of vane platforms to form a vane trailing edge extension.

In addition to one or more of the features described above, or as an alternative, further embodiments may include that in the stowed position a first radial end surface of the secondary vane body is flush with the first vane platform.

In addition to one or more of the features described above, or as an alternative, further embodiments may include that the secondary vane body includes a plurality of radially spaced tabs that support the secondary pressure side and secondary suction side of the secondary body, the plurality of tabs defining the leading edge of the secondary vane body and the tabs forming a first boss for positioning the secondary vane body at the trailing edge of the primary vane body.

In addition to one or more of the features described above, or as an alternative, further embodiments may include that the radial end of surface of the secondary vane body includes a plurality of protrusions forming a second boss for positioning secondary vane body against the second vane platform.

In addition to one or more of the features described above, or as an alternative, further embodiments may include that the trailing edge of the primary body includes a cooling air slot.

In addition to one or more of the features described above, or as an alternative, further embodiments may include that a trailing edge of the plurality of tabs is tapered to form an air convergence cavity within the secondary vane body, wherein the air convergence cavity receives air flowing from the trailing edge of the primary vane body when the secondary vane body is in the deployed position.

In addition to one or more of the features described above, or as an alternative, further embodiments may include that the secondary vane body includes a plurality of cooling holes in one or both of the secondary pressure side surface and secondary suction side surface proximate the air convergence cavity.

In addition to one or more of the features described above, or as an alternative, further embodiments may include that the secondary vane body includes a cooling slot extending from the leading edge to the trailing edge of the secondary body.

In addition to one or more of the features described above, or as an alternative, further embodiments may include that the trailing edge of the primary vane body includes a radially extending cutback slot along which the secondary leading edge of the secondary vane body is positioned in the deployed position.

Further disclosed is a gas turbine engine comprising a variable area turbine that includes a vane stage, the vane stage comprising one or more of the above features. Yet further disclosed is a method for decreasing a gage distance between at least two vanes in a plurality of vanes on a first stage of a variable area turbine comprising extending a stowed vane body from beneath a vane platform of at least one of the at least two vanes, the plurality of vanes including one or more of the above disclosed features.

BRIEF DESCRIPTION OF THE DRAWINGS

The following descriptions should not be considered limiting in any way. With reference to the accompanying drawings, like elements are numbered alike:

FIG. 9 illustrates a partial sectional view of a vane according to an embodiment of the disclosure;

FIG. 10 illustrates a partial sectional view of a vane according to an embodiment of the disclosure;

FIG. 11 illustrates a partial sectional view of a vane according to an embodiment of the disclosure;

DETAILED DESCRIPTION

A detailed description of one or more embodiments of the disclosed apparatus and method are presented herein by way of exemplification and not limitation with reference to the Figures.

Figure 1:
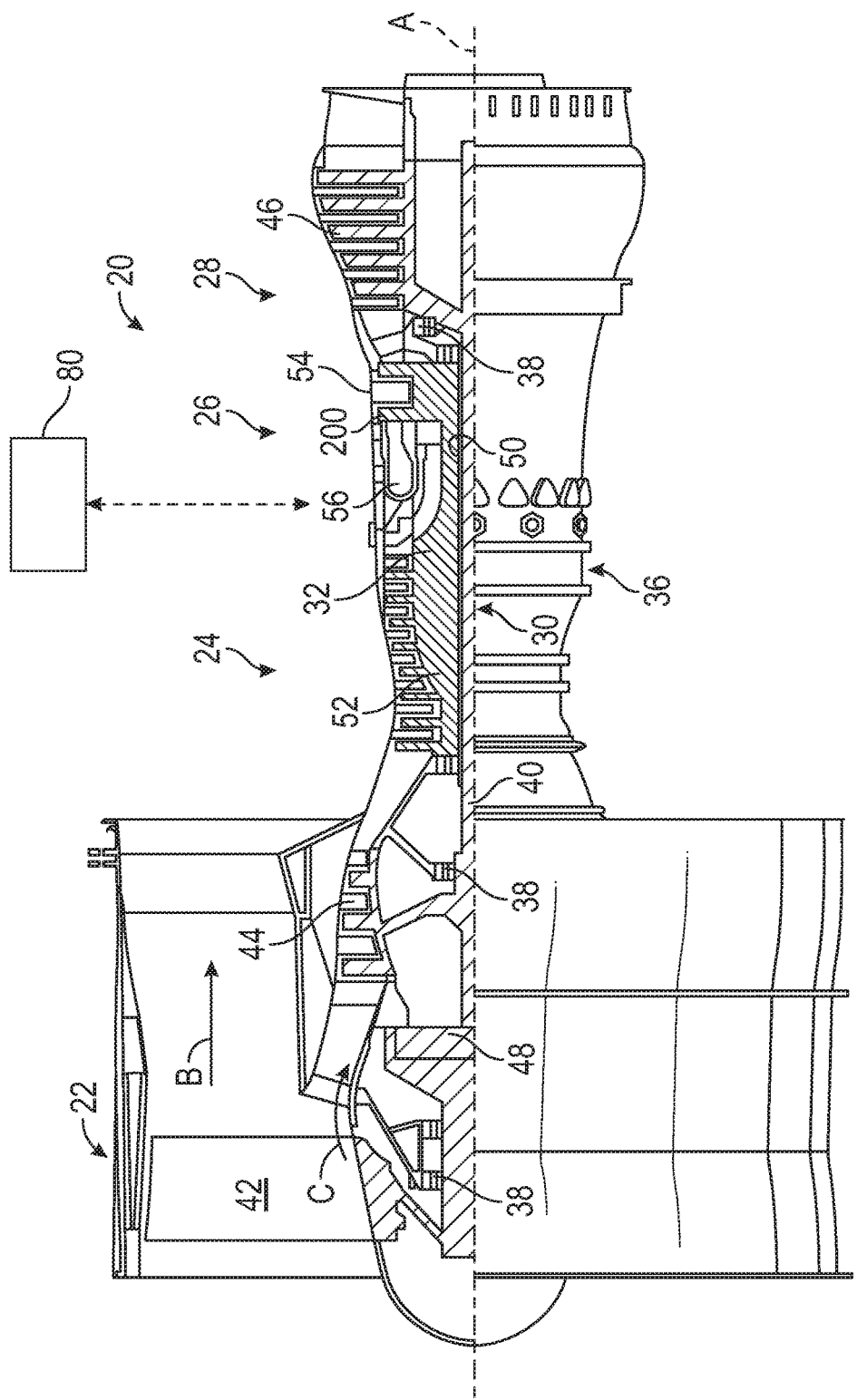
FIG. 1 is a partial cross section of a gas turbine engine according to an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

Figure 2:
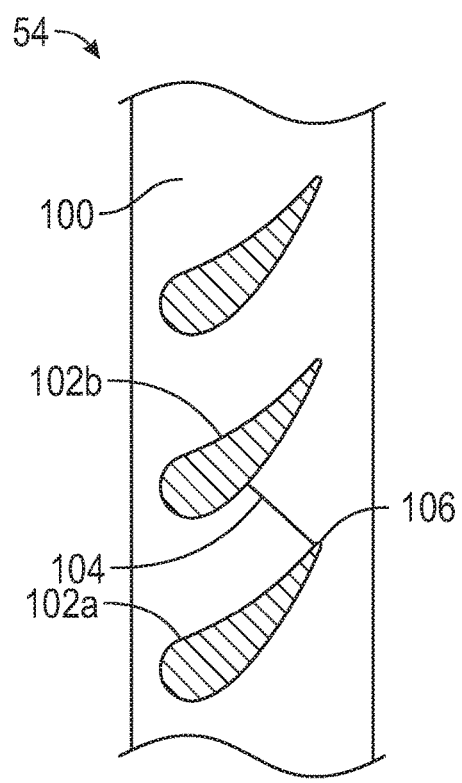
FIG. 2 illustrates a plurality of vanes according to an embodiment of the disclosure.

With reference to FIG. 2, illustrated is a segment of a high pressure turbine 54 and in particular a first stage 100 which may have a plurality or cascade of similarly configured vanes, including a first vane 102a and a second vane 102b. A gage distance 104 is the shortest distance between a trailing edge 106 of the first vane 102a and the second vane 102b. Decreasing the gage distance 104 may provide a smaller effective flow area between the vanes 102a, 102b and may therefore provide desirable aerodynamic properties during cruise where lower turbine output is required.

Figure 3:
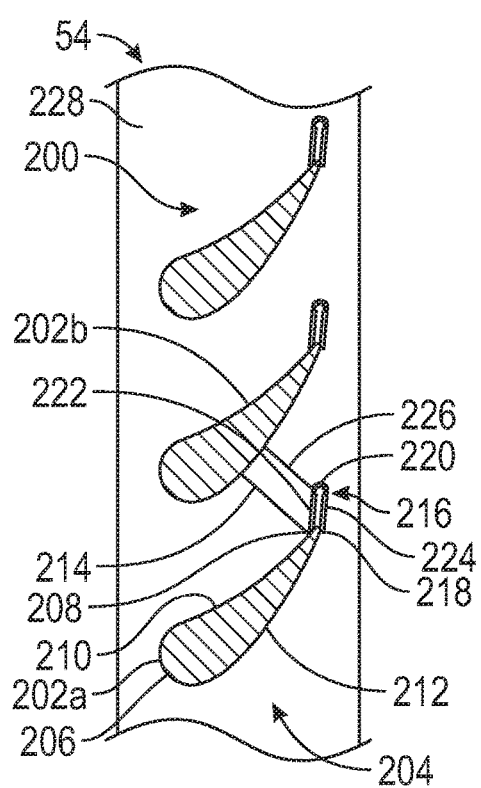
FIG. 3 illustrates a plurality of vanes according to an embodiment of the disclosure.

Referring now to FIG. 3 a portion of a high pressure turbine 54 and in particular a first stage 200 having a cascade or plurality of substantially similar vanes is illustrated. The plurality of vanes which may include a first vane 202a and a second vane 202b. The second vane 202b is circumferentially adjacent to a pressure side of the first vane 202a. The first vane 202a may have a primary vane body 204. The primary body 204 may have a primary airfoil. The primary airfoil may include a primary leading edge 206, a primary trailing edge 208, a primary pressure side 210 and a primary suction side 212. A primary gage distance 214 may be the shortest distance between the primary trailing edge 208 and the second vane 202b.

A secondary vane body 216 may have a secondary leading edge 218, a secondary trailing edge 220, a secondary pressure side 222 and a secondary suction side 224. The secondary leading edge 218 of the secondary body 216 may be provided without an airfoil leading edge shape because the secondary leading edge 218 may be disposed internally within the primary body 204 throughout its operating life. A secondary gage distance 226 may be the shortest distance between the secondary trailing edge 220 and the second vane 202b. The span of the secondary body 216 between the stage inner diameter platform 228 and the stage outer diameter platform (not illustrated) may be the same as for the primary body 204.

Figure 4:
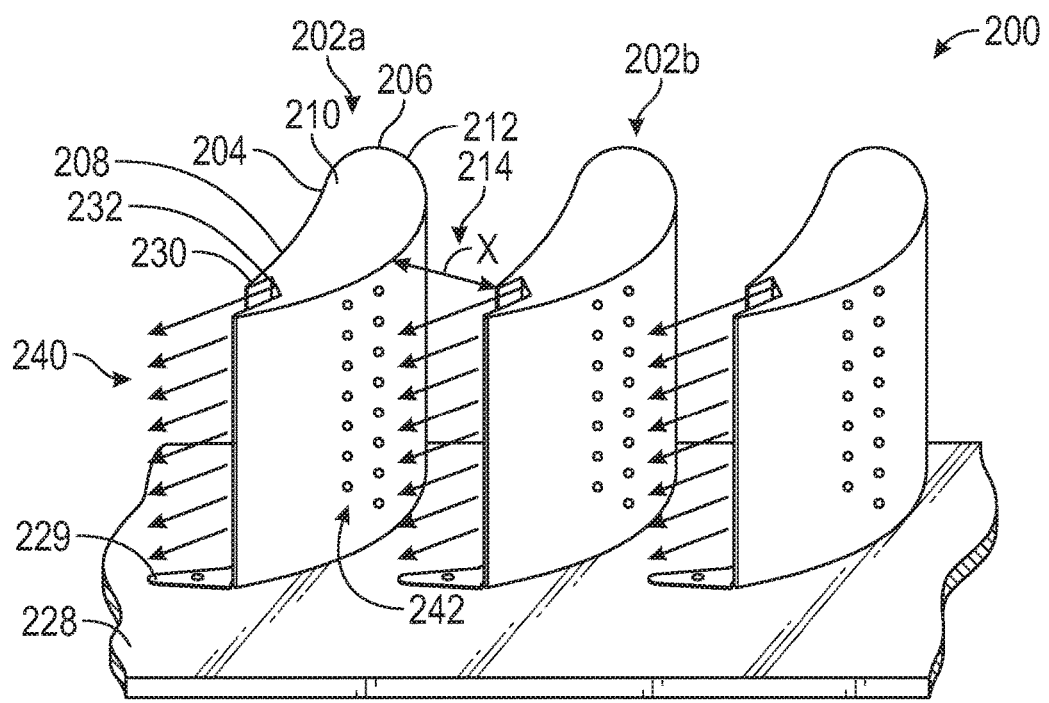
FIG. 4 illustrates a plurality of vanes according to an embodiment of the disclosure.
Figure 5:
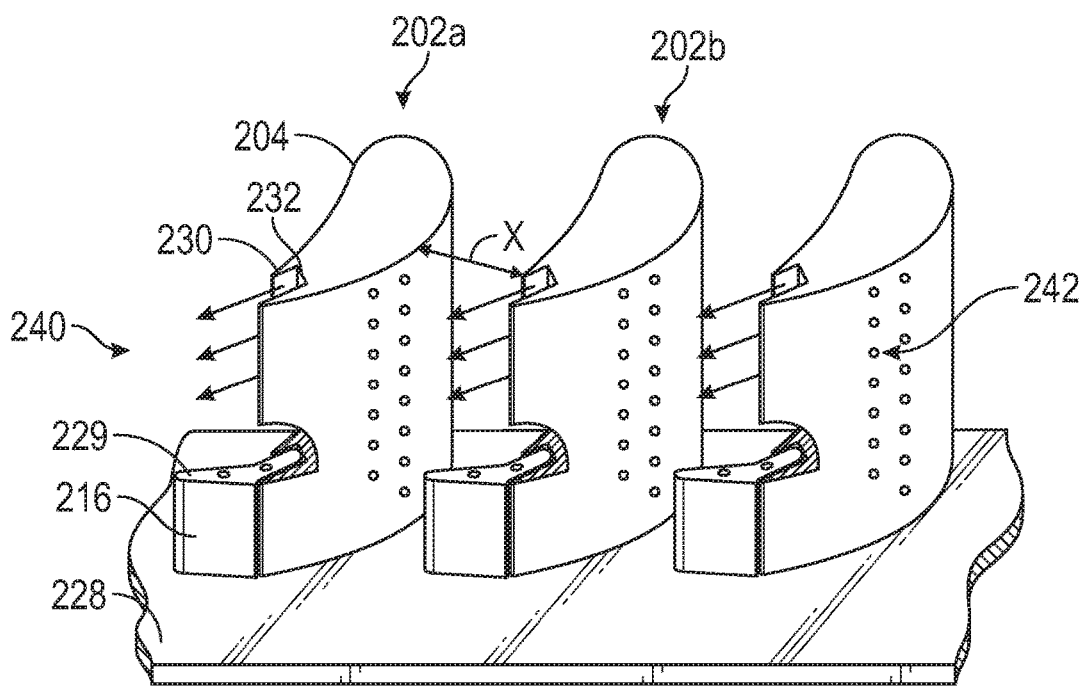
FIG. 5 illustrates partial sectional view of a plurality of vanes according to an embodiment of the disclosure.
Figure 6:
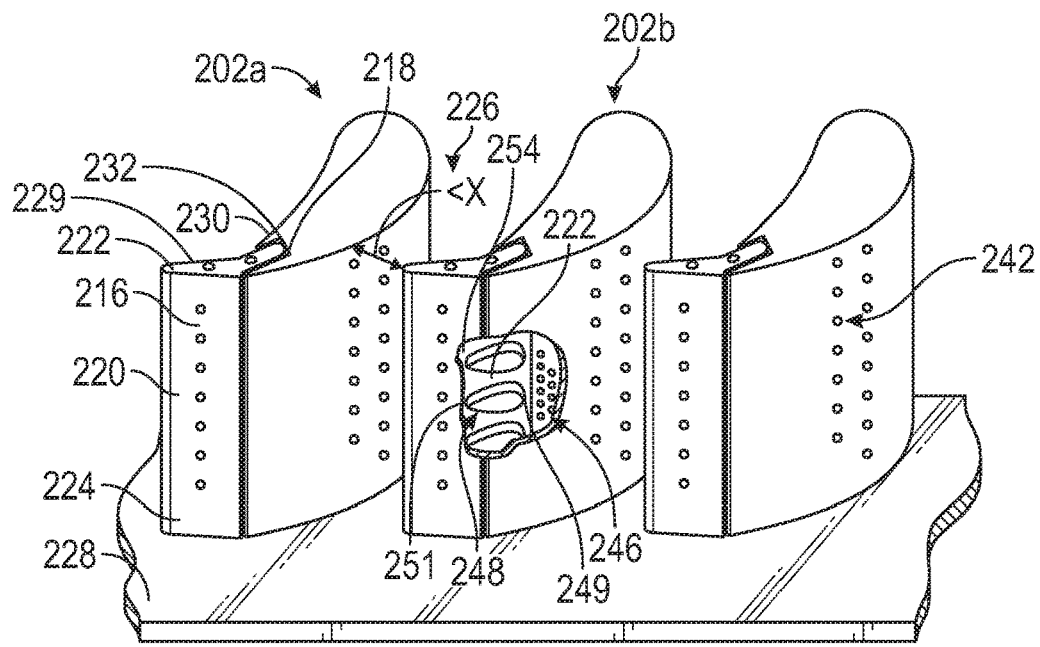
FIG. 6 illustrates a plurality of vanes according to an embodiment of the disclosure wherein one of the plurality of vanes is illustrated in a partial sectional view.

As illustrated in FIGS. 4-6, the primary body 204 may be fixedly disposed on the turbine stage 200. As illustrated in FIG. 4, the secondary body 216 may be in a first position which is a stowed position, wherein the radially outer surface 229 of the secondary body 216 is disposed radially flush with the platform 228. The secondary body 216 may also be in a second position illustrated in FIG. 6 which is the deployed configuration, wherein the secondary body extends from the inner platform to the outer platform to form a vane trailing edge extension. For the purpose of illustrating the progression of the secondary body 216 between the stowed position and the deployed position FIG. 5 illustrates a semi-deployed position of the secondary body 216.

As illustrated in FIG. 6 when the secondary body 216 is deployed the secondary gage distance 226 is obtained, which is used, for example, with cruise conditions. The secondary gage distance 226 may be smaller than the primary gage distance 214 illustrated in FIG. 4 which is used, for example, with takeoff flow conditions. Typical mechanisms such as solenoids or linkages (not illustrated) may be suitable for sliding deployment of the secondary body 216. It is within the scope of the disclosure to extend secondary bodies of different vanes in a cascade on one or a plurality a stages at mutually different rates and to mutually different lengths depending on decisions made by a Full Array Digital Engine Controller, or FADEC 80 (FIG. 1).

A primary vane trailing edge slot or cutback 230 is illustrated for receiving the secondary leading edge 218 of the secondary body 216. The cutback 230 can have a leading edge 232 with a profile that is complementary to the secondary leading edge 218 of the secondary body 216. As illustrated, the profile of the cutback 230 has a squared leading edge 232. With this configuration, the secondary leading edge 218 of the secondary body 216 functions as a first mechanical boss for maintaining proper positioning of the secondary body 216 and to provide for smooth aerodynamic flow over the suction and pressure side surfaces of the vane.

As illustrated in FIGS. 4, 6, 7 and 8 cooling of the secondary body 216 may be accomplished by utilizing a primary trailing edge flow 240 emerging from the cutback 230 in the primary body 204. Such flow 240 may be generated by the primary vane cooling air supply which is fed to the vane from either or both vane platforms (not shown) and which exits from an interior cooling passage 260 (FIG. 9) incorporated in the primary vane 204 which terminates in a radially-oriented slot 262 (FIG. 12) extending across most of the span of the trailing edge 208. As appreciated by one of ordinary skill in the art, film cooling holes 242 on the primary suction side 212 and/or the primary pressure side (not shown) may be another outlet for cooling air fed to the vane.

Downstream of the radial slot 232 in the cutback 230 air passes around and between a plurality of aerodynamic tabs 248. Illustrated in FIG. 6, the tabs 248 have a teardrop shape, with a bulbous side at the leading edge 249 of the tabs and a tapered side 251 at the trailing edge of the tabs 248. The tabs 248 may be radially spaced in the secondary body 216 and form structural supports for pressure side 222 and suction side 224 surfaces of the secondary body 216.

The tabs extend forward of the pressure and suction side surfaces of the secondary body 216 and fit into the cutback 230. Thus the plurality of tabs 248 serve as a first mechanical boss for positioning the secondary body 216 against the primary body 204. Downstream of the trailing edge of the tabs 248 airflow inside the secondary body 216 converges into a trailing edge cavity 254 in the secondary body 216 and exits via a plurality of film cooling holes 244. The film cooling holes may be on either or both of the suction side 222 or pressure side 224 of the secondary body 216.

Figure 7:
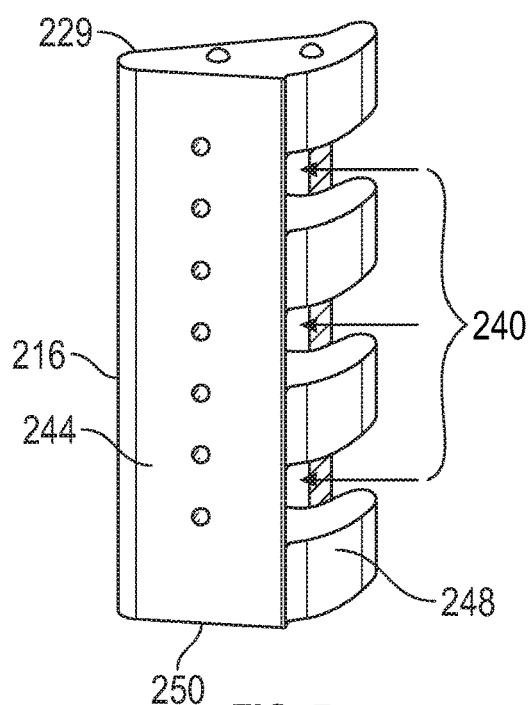
FIG. 7 illustrates a component of a vane according to an embodiment of the disclosure.
Figure 8:
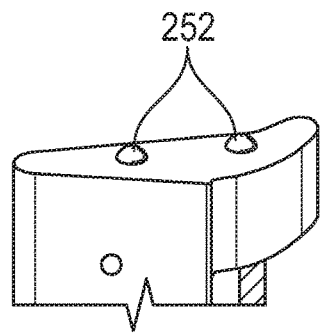
FIG. 8 illustrates a portion of a component of a vane according to an embodiment of the disclosure.

As illustrated in FIG. 7, the plurality of tabs 248 form radially inner 250 and outer 229 surfaces of the secondary body 216. On the radially outer surface 229, a plurality of radially extending hemispherical protrusions or bumps 252 as illustrated in FIG. 8 extend and fit into radial film cooling holes or, alternatively, into surface depressions which conform to the shape of the hemispherical protrusions on the second platform end wall (not show). The protrusions 252 function as second mechanical boss for locking the secondary body 216 against the second platform.

As illustrated in the cutaway in FIG. 6 pin type heat transfer fins 246 may be disposed within the interior cooling passage 260 (FIG. 9) incorporated in the primary vane 204. Such pin fins 246 may also be incorporated between the secondary pressure side surface 222 and secondary suction side surface 224 (not shown). Such fins 246 may assist in cooling of the secondary body 216 and may provide structural support to the secondary body.

FIGS. 9-11 illustrate additional embodiments for cooling the secondary vane body 216. In FIGS. 9-11 the mating configuration between the primary trailing edge 208 and the secondary leading edge 218 are schematically illustrated. It is to be appreciated that a cutback may be utilized as with the prior embodiment, but other structural mating configurations are within the scope of the disclosed embodiments.

Figure 12:
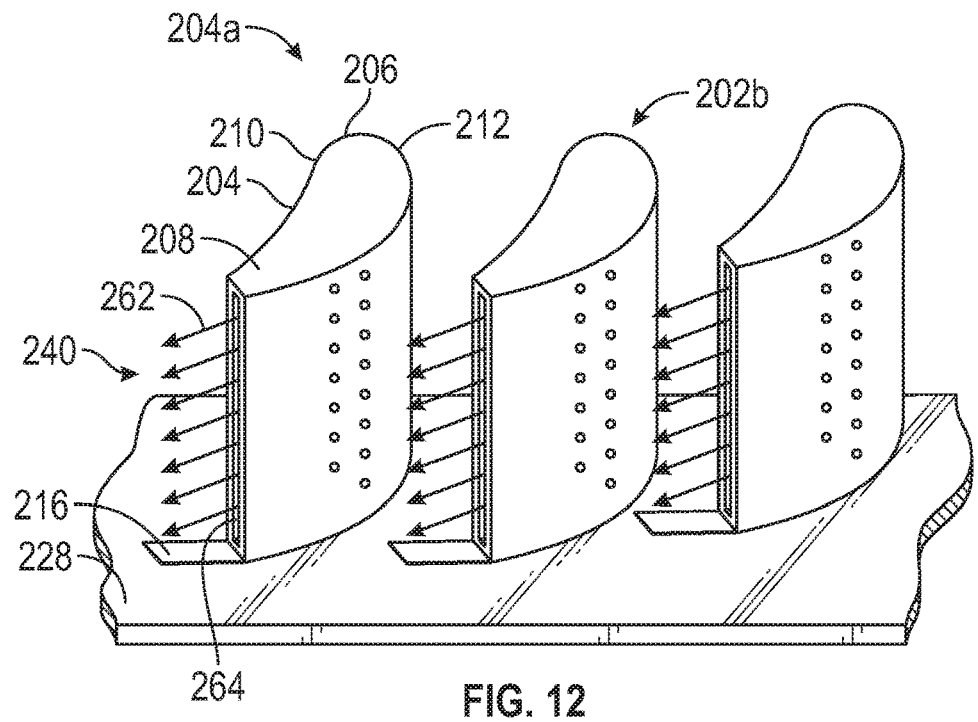
FIG. 12 illustrates a plurality of vanes according to an embodiment of the disclosure.
Figure 13:
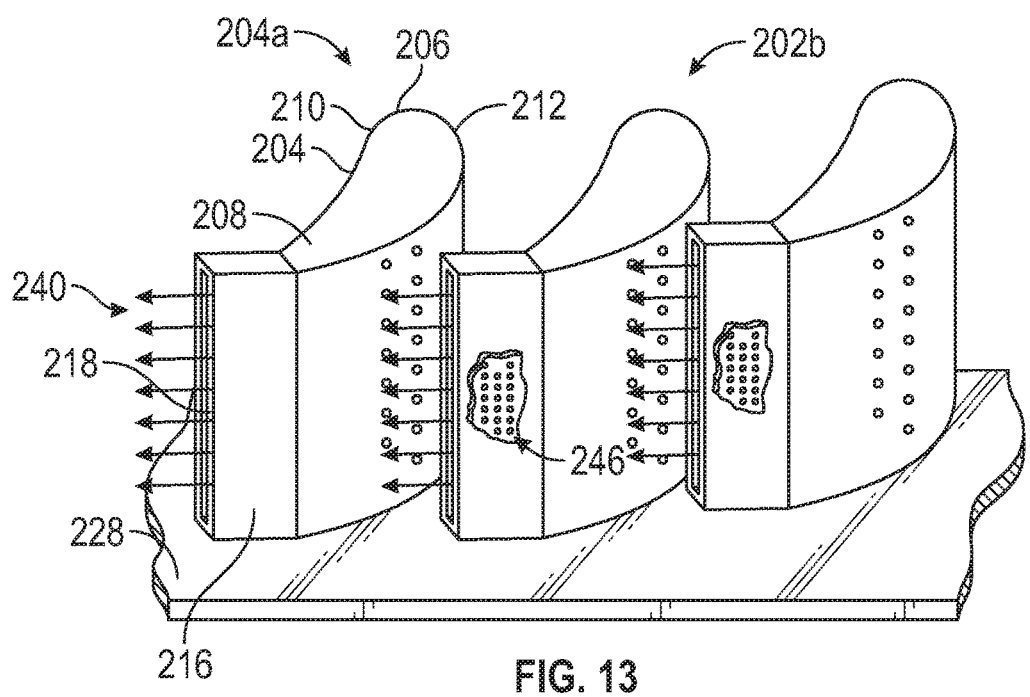
FIG. 13 illustrates a plurality of vanes according to an embodiment of the disclosure, wherein two of the plurality of vanes are illustrated in a partial sectional view.

FIG. 9 illustrates a thru passage 264 in the secondary body 216 through which cooling air exits the vane 202a. FIG. 12 illustrates a perspective view of the same configuration, where the trailing edge slot 262 is illustrated and the secondary body 216 is stowed. In FIG. 13, the same configuration is illustrated in which the secondary vane body 216 is deployed. Trailing edge flow 240 is illustrating exiting the secondary trailing edge 218 via the thru slot 264.

FIG. 10 illustrates a thru passage 266 that extends partially thru the secondary body 216. Cooling holes 268 may be provided in the pressure side of the secondary body 216 as well as cooling holes 270 in the suction side of the secondary body 216. FIG. 11 illustrates a cutback 230 where the secondary vane body 216 does not have an internal cooling channel but rather cooling air flows over the secondary pressure side surface 222 for cooling purposes.

The above disclosure is not intended to limit the application of the variable vane technology disclosed herein to a high pressure turbine. The variable vane technology disclosed herein is also applicable to, for example a low pressure turbine inlet vane.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vane stage for a variable area turbine, comprising:
a plurality of vane platforms comprising a first vane platform and a second vane platform, one of the plurality of vane platforms being a radial inner vane platform and another of the plurality of vane platforms being a radial outer vane platform, and a space therebetween defining an air flowpath;
a primary vane body secured at opposing radial ends to the first vane platform and the second vane platform, the primary vane body having a primary leading edge, a primary trailing edge, a primary pressure side and a primary suction side,
a secondary vane body movably secured at the first vane platform, the secondary vane body having secondary leading edge, a secondary trailing edge, a secondary pressure side and a secondary suction side, and
the secondary vane body being movable between a stowed position, wherein the secondary vane body is outside of the air flow path and a first radial end surface of the secondary vane body is flush with the first vane platform, and a deployed position, wherein the secondary vane body is extended between the plurality of vane platforms to form a vane trailing edge extension, and
the secondary vane body includes a plurality of radially spaced tabs that support the secondary pressure side and secondary suction side of the secondary body, the plurality of tabs defining the leading edge of the secondary vane body and the tabs forming a first boss for positioning the secondary vane body at the trailing edge of the primary vane body.

2. The vane stage of claim 1 wherein the radial end of surface of the secondary vane body includes a plurality of protrusions forming a second boss for positioning secondary vane body against the second vane platform.

3. The vane stage of claim 2 wherein the trailing edge of the primary body includes a cooling air slot.

4. The vane stage of claim 3 wherein a trailing edge of the plurality of tabs is tapered to form an air convergence cavity within the secondary vane body, the wherein the air convergence cavity receives air flowing from the trailing edge of the primary vane body when the secondary vane body is in the deployed position.

5. The vane stage of claim 4 wherein the secondary vane body includes a plurality of cooling holes in one or both of the secondary pressure side surface and secondary suction side surface proximate the air convergence cavity.

6. The vane stage of claim 3 wherein the secondary vane body includes a cooling slot extending from the leading edge to the trailing edge of the secondary body.

7. The vane stage of claim 3 wherein the trailing edge of the primary vane body includes a radially extending cutback slot along which the secondary leading edge of the secondary vane body is positioned in the deployed position.

8. A gas turbine engine comprising:
a variable area turbine that includes a vane stage, the vane stage comprising:
a plurality of vane platforms comprising a first vane platform and a second vane platform, one of the plurality of vane platforms being a radial inner vane platform and another of the plurality of vane platforms being a radial outer vane platform, and a space therebetween defining an air flowpath;
a primary vane body secured at opposing radial ends to the first vane platform and the second vane platform, the primary vane body having a primary leading edge, a primary trailing edge, a primary pressure side and a primary suction side,
a secondary vane body movably secured at the first vane platform, the secondary vane body having secondary leading edge, a secondary trailing edge, a secondary pressure side and a secondary suction side,
the secondary vane body being movable between a stowed position, wherein the secondary vane body is outside of the air flow path and a first radial end surface of the secondary vane body is flush with the first vane platform, and a deployed position, wherein the secondary vane body is extended between the plurality of vane platforms to form a vane trailing edge extension, and
the secondary vane body includes a plurality of radially spaced tabs that support the secondary pressure side and secondary suction side of the secondary body, the plurality of tabs defining the leading edge of the secondary vane body and the tabs forming a first boss for positioning the secondary vane body at the trailing edge of the primary vane body.

9. The engine of claim 8 wherein the radial end of surface of the secondary vane body includes a plurality of protrusions forming a second boss for positioning secondary vane body against the second vane platform.

10. The engine of claim 9 wherein the trailing edge of the primary body includes a cooling air slot.

11. The engine of claim 10 wherein a trailing edge of the plurality of tabs is tapered to form an air convergence cavity within the trailing edge of the secondary vane body, the wherein the air convergence cavity receives air flowing from the first plurality of film cooling holes when the secondary vane body is in the deployed position.

12. The engine of claim 11 wherein the secondary vane body includes a plurality of cooling holes in one or both of the secondary pressure side surface and secondary suction side surface proximate the air convergence cavity.

13. The engine of claim 10 wherein the secondary vane body includes a cooling slot extending from the leading edge to the trailing edge of the secondary body.

14. The engine of claim 10 wherein the trailing edge of the primary vane body includes a radially extending cutback slot along which the secondary leading edge of the secondary vane body is positioned in the deployed position.

15. A method for decreasing a gage distance between at least two vanes in a plurality of vanes on a first vane stage of a variable area turbine, the first vane stage comprising:
a plurality of vane platforms comprising a first vane platform and a second vane platform, one of the plurality of vane platforms being a radial inner vane platform and another of the plurality of vane platforms being a radial outer vane platform, and a space therebetween defining an air flowpath;
a primary vane body secured at opposing radial ends to the first vane platform and the second vane platform, the primary vane body having a primary leading edge, a primary trailing edge, a primary pressure side and a primary suction side, a secondary vane body movably secured at the first vane platform, the secondary vane body having secondary leading edge, a secondary trailing edge, a secondary pressure side and a secondary suction side, and the secondary vane body being movable between a stowed position, wherein the secondary vane body is outside of the air flow path and a first radial end surface of the secondary vane body is flush with the first vane platform, and a deployed position, wherein the secondary vane body is extended between the plurality of vane platforms to form a vane trailing edge extension, and the secondary vane body includes a plurality of radially spaced tabs that support the secondary pressure side and secondary suction side of the secondary body, the plurality of tabs defining the leading edge of the secondary vane body and the tabs forming a first boss for positioning the secondary vane body at the trailing edge of the primary vane body;

the method comprising extending the secondary vane body from the stowed position to the deployed position.

16. The method of claim 15 wherein each of the plurality of vanes includes a primary vane body fixedly disposed on the first stage of the variable area turbine.

* * * * *